(Model.)
J. H. McLEAN.
NUT LOCK.
No. 338,095.
Patented Mar. 16, 1886.
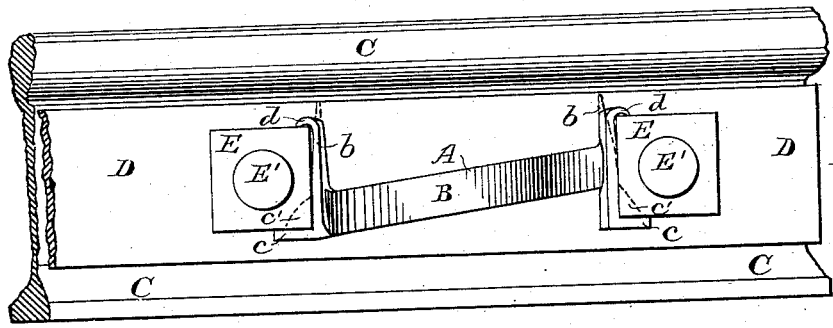
Fig. 1.
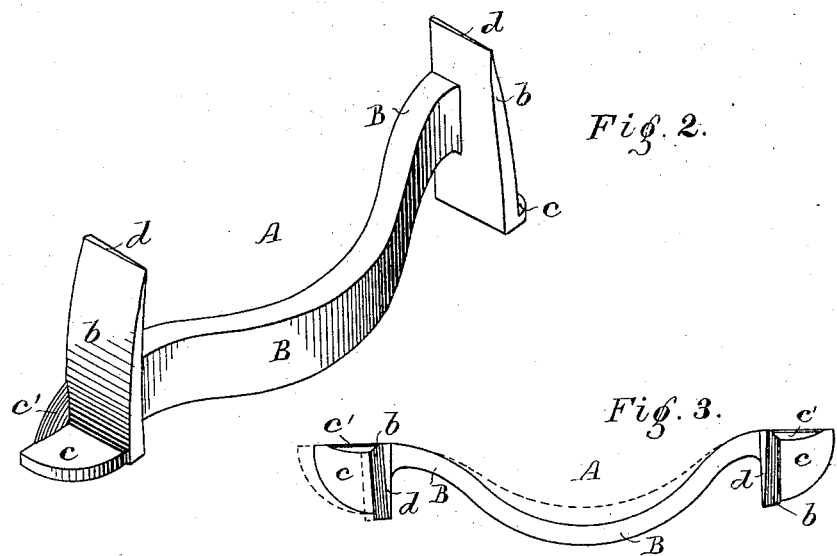
Fig. 2.
Fig. 3.
Witnesses:
Chas. E. Metz
Wm C. Richmond
Inventor:
James Henry McLean
per.
Chas. F. Meisner
Attorney.

UNITED STATES PATENT OFFICE.

JAMES HENRY McLEAN, OF ST. LOUIS, MISSOURI.

NUT-LOCK.

SPECIFICATION forming part of Letters Patent No. 338,095, dated March 16, 1886.

Application filed June 19, 1885. Serial No. 169,231. (Model.)

*To all whom it may concern:*

Be it known that I, JAMES HENRY MCLEAN, a citizen of the United States, and a resident of St. Louis, Missouri, have invented certain new and useful Improvements in Fish-Plate Nut-Locks, of which the following is a specification.

This invention specially relates to an improved device adapted for the purpose of permanently locking the nuts on fish-plates of railroad-rails, and to prevent the nuts from becoming loosened through the rattling, shaking, and knocking caused by the trains passing over the joints, thereby adding safety to travel and saving expense in looking after the nuts and tightening them up, as now generally required.

The improvements consist of a bar placed diagonally between two nuts, said bar being provided with catch-lugs and bearings at each end, which latter each embrace a nut to prevent its turning, and also to keep the bar in place, and said bar being arched, so that play may be taken up and the said bar be wedged between the two nuts by means of a blow, which flattens the arch, and thus lengthens the bar.

To more fully describe the construction and operation of my invention, and to enable others to fully understand the same, reference is had to the accompanying drawings, in which—

Figure 1 is a side view of a rail and fish-plate, showing my improved device attached to a pair of nuts, same being locked. Fig. 2 is a perspective view of my improved device. Fig 3 is a top plan of same.

Similar letters refer to similar parts throughout the several views.

A represents my improved fish-plate nut-lock; B, the diagonal arched bar.

*b* are bearings provided at each end of the diagonal bar. These bearings *b* are provided below with a toe, *c*, and a catch-lug, *c'*. (See Figs. 2 and 3.)

The diagonal bar is arched outward, as clearly shown in Figs. 2 and 3.

C is the rail, D is the fish-plate, E are the nuts, and E' the bolts.

When my device is applied to the nuts, the bar B assumes the diagonal and inclined position, as shown in Fig. 1, and the bearings *b* extend along and against the inner sides of the two opposite nuts, the device thus being between both nuts. The bottom ends of these bearings being provided with the toe *c*, which comes underneath each nut, thus hold the device from moving up. The upper ends of the bearings are made to extend up beyond the top of the nuts, and are bent over the top of the nuts, as shown at *d*, Fig. 1, thus keeping the device from moving down, and finally the catch-lugs *c'*, at the rear lower corner of the bearings, engage behind the nuts between same and the fish-plate and prevent the device from moving out or forward. Thus the device is held firm and stationary in place and in engagement with the nuts, and in order to wedge the device between the nuts, so as to prevent them from rattling and turning, the arched portion of the diagonal bar is flattened by a blow, thereby lengthening same and wedging the parts solid against the nuts. The fact of the diagonal bar being arched allows for expansion and contraction of the rails, as in case of expansion a slight blow with a hammer on the arched bar lengthens same and adapts it to the increased span, and in case of contraction the arch will rise through the pressure at the ends caused by the nuts coming closer together, thus shortening the bar proportionately.

As clearly shown in the drawings, the faces of the bearings *b* are curved or recede from the toes *c*, which facilitates the application of the nut-lock without disturbing the nuts after they have been turned on and stopped with their adjacent faces parallel to each other and perpendicular to the plane of the bolts, as shown.

To apply the lock, one of the lugs *c'* is first slipped under the corner of one nut, and the end of the bar B, having other lug *c'*, is lowered until said lug will pass the corner of the other nut. It is then pressed inward toward the fish-plate D until the said lug comes into contact therewith, whereupon the end of the bar is elevated until the toe *c* bears against the under side of the nut. The thin upper extremity of the bearing-piece is then bent over the nut.

I am aware that it has been proposed to connect, by means of a bar, two bearing-pieces similar to *b*, each of which is provided with a toe and a lug similar to *c* and *c'* at both ends, but this is not the equivalent of my invention, as its use is limited to nuts of about one size, whereas by forming the upper end of the bearing thin, as shown, it is adapted to be bent over and lock nuts differing widely in size.

The diagonal position given to the bar adapts it to receive the strain in direct line of the nuts through their tendency to turn, and thus adds strength to the bar, the strain thus coming in longitudinal line with the bar.

The inclination of the diagonal bar may be varied, as desired, to best adapt it for practical use.

I am also aware that it has been proposed to connect two nut-locks by a straight bar, which is provided at its center with an outwardly-curved portion, which when struck with a hammer is more or less straightened, thereby forcing the two blocks farther apart. In all devices of this character with which I am familiar the connecting-bar is placed in the same plane as the bolts, and when lengthened exerts pressure in opposite directions directly against the bolts. This is not the equivalent of my diagonal bar, which is so located that when lengthened it will tend to tighten both nuts.

The whole device is cast or otherwise made of soft metal which is non-sonorous, and thus does away with the constant click (by deadening the sound) so much heard when the trains are passing over the joints, thus making it a noiseless joint, which greatly adds to the comfort of travel.

This lock can be removed and applied readily as often as desired without destroying its utility.

This device is simple in construction, cheap in its production, and durable and effective in operation, and is applicable to other machinery where nuts are used in pairs, whether square or hexagon.

Having thus fully described the construction and operation of my invention, what I claim is—

1. The combination, with a pair of nuts, of a bearing-piece having a lug fitting behind and a toe fitting beneath one nut, a second bearing-piece having a lug fitting behind and a thin end adapted to be bent over the top of the other nut, and a bar connecting said bearing-pieces, substantially as set forth.

2. The combination, with a pair of nuts, of a bearing-piece having a lug fitting behind and a toe beneath one nut, a second bearing-piece having a curved face, a lug, and a thin extremity, and a bar connecting said bearing-pieces, substantially as set forth.

3. The combination, with the bolts E E, of the curved bearing-pieces $b\ b$, having the lugs $c'\ c'$, toes $c\ c$, and thin extremities $d$, and the curved diagonal bar B, connecting said bearing-pieces, substantially as set forth.

In testimony of said invention I have hereunto set my hand.

JAMES HENRY McLEAN.

Witnesses:
L. F. CAMPBELL,
CHAS. F. MEISNER.